(12) United States Patent
Wang et al.

(10) Patent No.: US 8,693,570 B2
(45) Date of Patent: Apr. 8, 2014

(54) COMMUNICATION METHODS AND SYSTEMS HAVING DATA PERMUTATION

(75) Inventors: Lai-Huei Wang, Bade (TW); Chia-Lung Tsai, Hsinchu (TW); Yu-Tao Hsieh, Hsinchu (TW); Pang An Ting, Fongyuan (TW); Jen-Yuan Hsu, Jincheng Township (TW)

(73) Assignee: Industrial Technology Research Institute, Hsinchu (TW)

( * ) Notice: Subject to any disclaimer, the term of this patent is extended or adjusted under 35 U.S.C. 154(b) by 794 days.

(21) Appl. No.: 12/605,590

(22) Filed: Oct. 26, 2009

(65) Prior Publication Data

US 2010/0111219 A1 May 6, 2010

Related U.S. Application Data

(60) Provisional application No. 61/110,134, filed on Oct. 31, 2008, provisional application No. 61/158,869, filed on Mar. 10, 2009, provisional application No. 61/159,524, filed on Mar. 12, 2009.

(51) Int. Cl.
*H04L 27/00* (2006.01)

(52) U.S. Cl.
USPC .......................................................... 375/295

(58) Field of Classification Search
USPC .......................................... 375/295, 296, 316
See application file for complete search history.

(56) References Cited

U.S. PATENT DOCUMENTS

| | | | |
|---|---|---|---|
| 5,737,252 A | 4/1998 | Hollmann et al. | |
| 7,952,989 B2 * | 5/2011 | Qi et al. | 370/208 |
| 2004/0064666 A1 * | 4/2004 | Bickerstaff | 711/200 |
| 2005/0204259 A1 * | 9/2005 | Ishida | 714/755 |
| 2007/0064831 A1 * | 3/2007 | Bjerke et al. | 375/267 |
| 2007/0101231 A1 * | 5/2007 | Kutz et al. | 714/755 |
| 2008/0079574 A1 | 4/2008 | Soffer | |
| 2008/0080641 A1 | 4/2008 | Kim | |
| 2008/0115032 A1 | 5/2008 | Henige et al. | |
| 2008/0240281 A1 | 10/2008 | Gaal et al. | |

OTHER PUBLICATIONS

Fwu, Jong-Kae (JK), et al., Proposed Text of DL Physical Layer Section for the IEEE 802.16m Amendment. Intel Corporation, IEEE C802.16m-08/1443r2, Nov. 3, 2008.
OFDM and Multi-Channel Communication Systems, NI Developer Zone, National Instruments, Jan. 2, 2007.

* cited by examiner

*Primary Examiner* — Kevin M Burd
(74) *Attorney, Agent, or Firm* — Finnegan, Henderson, Farabow, Garrett & Dunner, LLP

(57) ABSTRACT

A wireless communication method may include receiving a first data stream comprising a data sequence and computing a permutation sequence based on a content of the received first data stream. The permutation sequence is a non-predetermined sequence. The method may further include performing a permutation on the first data stream based on the permutation sequence to generate a permuted first data stream being configured for wireless transmission.

36 Claims, 8 Drawing Sheets

| Initial Sequence $A_{in}$ (Decimal Numbers) | Binary Expression (3 bits) Before Bit Reversal | | Binary Expression After Bit Reversal | Resultant Sequence $BRO_3$ (Decimal Numbers) |
|---|---|---|---|---|
| 0 | 000 | | 000 | 0 |
| 1 | 001 | | 100 | 4 |
| 2 | 010 | Bit Reversal | 010 | 2 |
| 3 | 011 |  | 110 | 6 |
| 4 | 100 | | 001 | 1 |
| 5 | 101 | | 101 | 5 |
| 6 | 110 | | 011 | 3 |
| 7 | 111 | | 111 | 7 |

COMMUNICATION METHODS AND SYSTEMS HAVING DATA PERMUTATION

PRIORITY

This application claims the benefit of priority of U.S. Provisional Application No. 61/110,134, filed Oct. 31, 2008 and titled "PERMUTATION DESIGN," U.S. Provisional Application No. 61/158,869, filed Mar. 10, 2009 and titled "PERMUTATION SEQUENCE DESIGN," and U.S. Provisional Application No. 61/159,524, filed Mar. 12, 2009, and titled "COMMUNICATION METHODS AND SYSTEMS WITH PERMUTATION SCHEMES," the entire contents of which are incorporated herein by reference.

TECHNICAL FIELD

The present disclosure relates generally to communication methods and systems and, more particularly, to communication methods and systems having data permutation.

BACKGROUND

In modern communication systems, signals may be transmitted from a source location to a destination location in analog or digital forms. As an example, the use of digital data communication may increase capacity of data transmission, flexibility of data manipulation, etc. Signals containing data, such as data derived from test, image, voice, video, etc., may be encoded into sequences of symbols or binary symbols, which are then transmitted from a transmitter to a receiver through one or more communication channels, such as via a cable or over-the-air.

In digital communication systems, data can be transmitted through one or more frequency bands within a finite frequency bandwidth. When multiple channels are used, these channels may overlap one another, and interferences may occur between the overlapped channels. One method to reduce or eliminate the interferences is to utilize orthogonal frequency division multiplexing (OFDM). In an OFDM system, a single channel may include multiple subcarriers having different but adjacent frequency bands. Although these subcarriers may overlap one another, they are orthogonal to one another, thereby reducing or eliminating the interferences caused by frequency overlap.

Examples of OFDM communication systems include systems complying with IEEE 802.16e or 802.16m standards. One version of such standards includes a proposal to IEEE C802.16m-08/1443 standard, titled "Proposed Text of DL Physical Layer Section for the IEEE 802.16m Amendment" ("Reference 1"). In a system consistent with Reference 1, permutation is utilized to increase the diversity of a channel coding block by changing the location of data subcarriers. It is desired to evenly permute the contiguous data subcarriers in physical frequency to prevent a forward error correction (FEC) block from bursting errors. The forward error correction block is configured to correct errors in the data stream as long as the number of the errors is under control. However, once there are too many errors in the FEC block, the FEC block may fail to correct the errors. By applying permutation, the burst errors in frequency or time domain can be distributed to several FEC blocks so that each block is able to correct errors. In the proposal to IEEE 802.16m standard, i.e., Reference 1, a large table of permutation sequences is relied upon to obtain the results of random distribution. However, this method may require a large number of memories or other storage devices for storing the large permutation sequence table, which may lead to increased hardware complexity and degraded system performance in certain applications.

Therefore, it may be desirable to have alternative communication systems and methods having alternative permutation approaches.

SUMMARY

In one exemplary embodiment, the present disclosure is directed to a wireless communication method. The method includes receiving a first data stream comprising a data sequence. The method also includes computing a permutation sequence based on a content of the received first data stream, the permutation sequence being a non-predetermined sequence. The method further includes performing a permutation on the first data stream based on the permutation sequence to generate a permuted first data stream being configured for wireless transmission.

In one exemplary embodiment, the present disclosure is directed to a system for wireless communication. The system includes an input interface configured to receive an input of a first data stream, the first data stream comprising at least one data sequence. The system also includes a coding device configured to apply a permutation on the first data stream based on a permutation sequence. The coding device includes a computational circuit configured to compute the permutation sequence based on a content of the at least one data sequence of the first data stream, the computed permutation sequence being a non-predetermined sequence. The coding device also includes a permutation device configured to apply the permutation to the first data stream based on the permutation sequence. The system further includes an output interface configured to output the permuted first data stream.

In one exemplary embodiment, the present disclosure is directed to a wireless communication method. The method includes receiving a first data stream comprising a data sequence. The method also includes computing a permutation sequence based on at least a length of the received first data stream using a computational circuit without relying on a lookup table containing predetermined permutation sequences. The method further includes performing a permutation on the first data stream based on the permutation sequence to generate a permuted first data stream being configured for wireless transmission.

DETAILED DESCRIPTION

Figure 1:
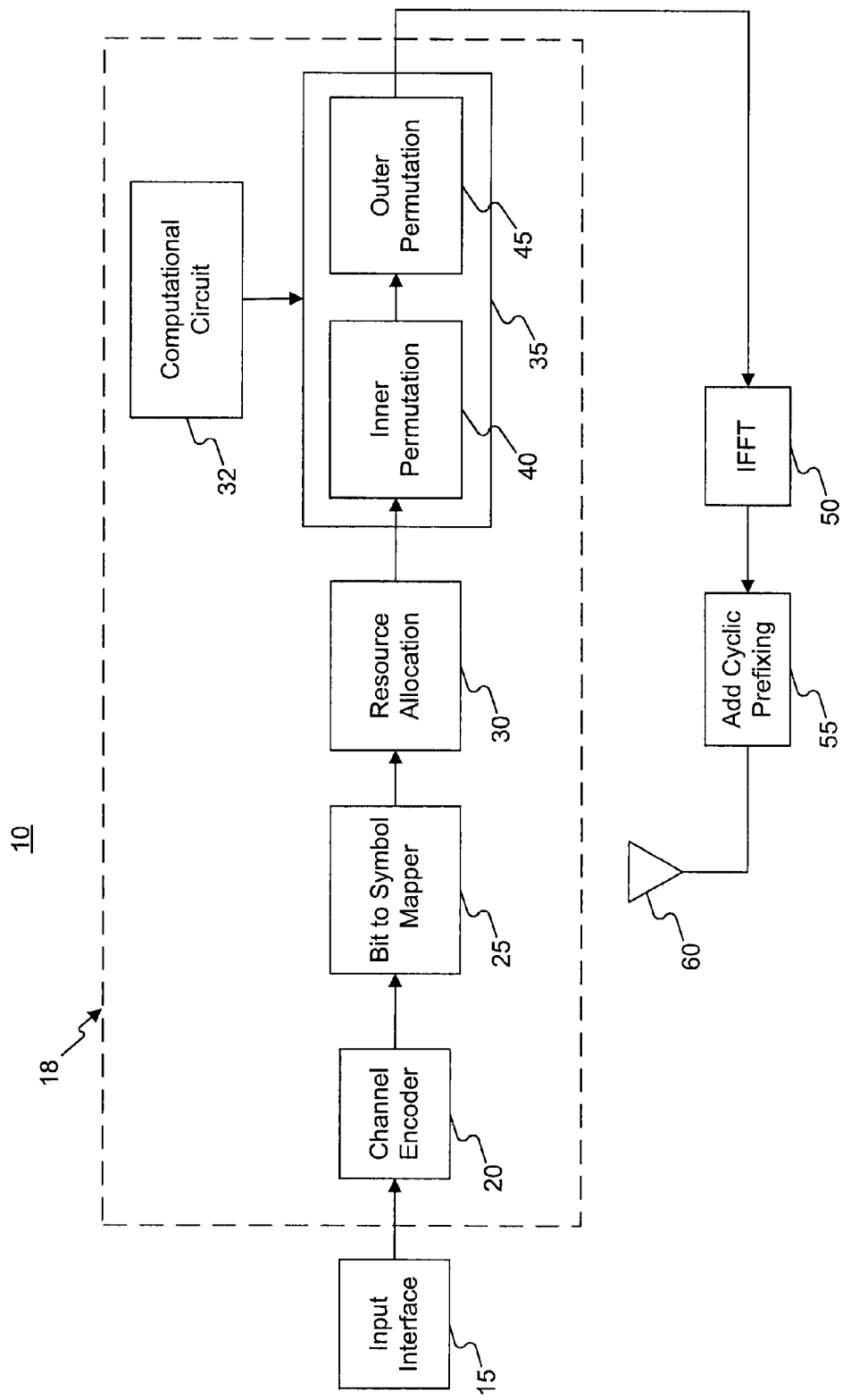
FIG. 1 illustrates a schematic block diagram of an exemplary system for wireless communication consistent with the disclosed embodiments.

FIG. 1 schematically illustrates an exemplary system 10 consistent with the disclosed embodiments. The system 10 may be at least a part of a wireless communication system, for example, a coded OFDM communication system at a transmitter side. The system 10 may include an input interface 15 configured to receive an input of a data stream, which may include at least one data sequence having, for example, uncoded data bits. The system 10 may include a coding device 18 configured to apply a coding, such as turbo coding and/or a permutation to the data stream. The coding device 18 in one embodiment may include a channel encoder 20, a bit to symbol mapper 25, and a resource allocation device 30. The channel encoder 20 may receive the input data stream including uncoded data bits, and may encode the data stream using any suitable techniques, such as convolutional turbo coding or other coding techniques. Coded data bits may then be mapped into data symbols of a predetermined length by the bit-to-symbol mapper 25. The resource allocation device 30 may be configured to distribute the data symbols onto two or more subcarrier frequencies in frequency domain to form a number of logical resource units (LRUs). Each LRU may be in form of an $N_F$ by $N_T$ matrix, where $N_F$ and $N_T$ may be integer numbers, with $N_F$ indicating the number of subcarrier frequencies, and $N_T$ indicating the number of symbols. Each row of the LRU may correspond to a subcarrier frequency, and each column of the LRU may correspond to a symbol or a time index. As a result, each small block of the $N_F$ by $N_T$ matrix in the LRU may correspond to a subcarrier, which further corresponds to a combination of a subcarrier frequency and a time index. Thus, each LRU may include $N_F$ by $N_T$ subcarriers.

In one embodiment, the coding device 18 may also include a computational circuit 32 configured to compute a permutation sequence based on a content of the at least one data sequence of the data stream. The computed permutation sequence may be a non-predetermined sequence. In other words, the permutation sequence may be computed based on the data sequence and may not be retrieved from a lookup table, for example, that contains predetermined permutation sequences. The coding device 18 may also include a permutation device 35 configured to apply a permutation to the data stream based on the permutation sequence computed by the computational circuit 32. In one embodiment, the permutation device 35 may include an inner permutation device 40, or an outer permutation device 45, or both. Each of the inner and outer permutation devices 40 and 45 may be configured to permute the data stream based on computed permutation sequences. For example, the inner permutation device 40 may be configured to perform an inner permutation on the data stream at the subcarrier level by permuting the subcarriers, whereas the outer permutation device 45 may be configured to perform an outer permutation on the data stream at the resource unit level by permuting the resource units.

As shown in FIG. 1, the data stream may be first permuted by the inner permutation device 40 and then be permuted by the outer permutation device 45. It is contemplated that the data stream may also be first permuted by the outer permutation device 45 and then be permuted by the inner permutation device 40. It is also contemplated that the permutation device 35 may not include separate inner and outer permutation devices, but instead, may include one single permutation module configured to perform both the inner and outer permutation.

A plurality of physical resource units (PRUs) may be formed after the logical resource units are permuted by the permutation device 35. The permuted data stream including the physical resource units may be further processed by an Inverse Fast Fourier Transformation (IFFT) device 50, which may apply a suitable inverse Fast Fourier Transformation algorithm to the permuted data stream. The system 10 may also include an Add Cyclic Prefixing device 55, which may add a cyclic prefixing to the permuted data stream based on a predetermined algorithm. The permuted data stream may be output by an output interface 60 for wireless transmission, which may be a wireless communication antenna. It is contemplated that the system 10 may include a greater or lesser number of components.

Figure 2:
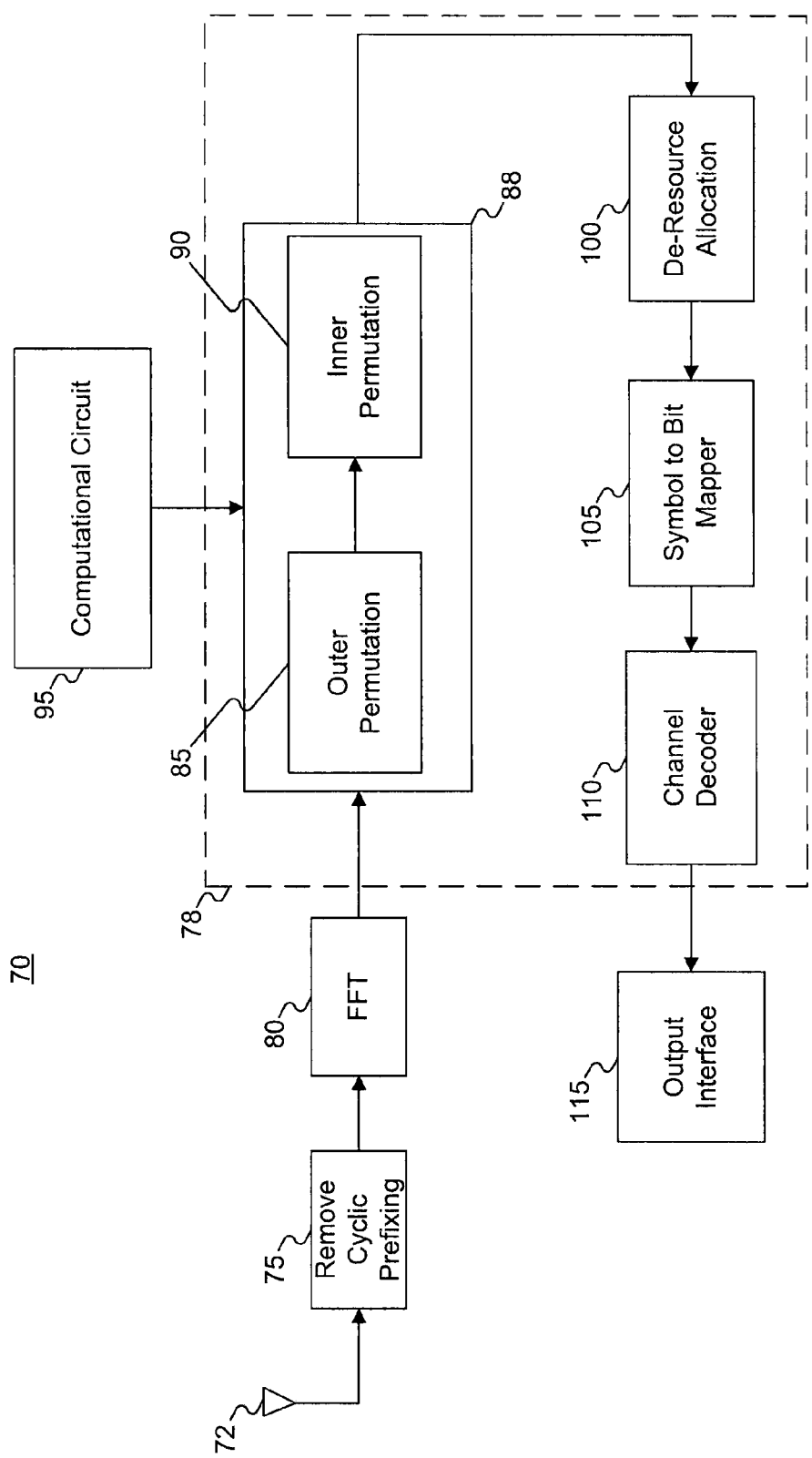
FIG. 2 illustrates a schematic block diagram of an exemplary system for wireless communication consistent with the disclosed embodiments.

FIG. 2 schematically illustrates an exemplary system 70 consistent with the disclosed embodiments. The system 70 may be at least a part of a wireless communication system, for example, a coded OFDM communication system at the receiver side. The system 70 may include a data receiving device 72, such as an antenna, configured to receive a signal containing a data stream, for example, a data stream transmitted from the system 10 on the transmitter side. The data stream may contain at least one data sequence.

The system 70 may include a Remove Cyclic Prefixing device 75 configured to remove a cyclic prefixing, which may have been added to the data stream received by the receiving device 72. The system 70 may include a Fast Fourier Transformation device 80, which may be located downstream of the Remove Cyclic Prefixing device 75, and configured to apply a suitable Fast Fourier transformation to the data stream. The system 70 may include a decoding device 78. The decoding device 78 may include a plurality of devices, for example, a permutation device 88, a computational circuit 95, a de-resource allocation device 100, a symbol to bit mapper 105, and a channel decoder 110. It is contemplated that the decoding device 78 may include a greater or lesser number of components. The decoding device 78 may be configured to apply one or more coding or decoding processes to the data stream. The permutation device 88 may be configured to apply one or more permutation processes to the data stream, and may include an outer permutation device 85 and/or an inner permutation device 90.

The computational circuit 95 may be similar to the computational circuit 32 shown in FIG. 1. The computational circuit 95 may be configured to compute permutation sequences based on a content of the at least one data sequence of the data stream. The computed permutation sequence may be a non-predetermined sequence. In other words, the permutation sequence may be computed based on the data sequence and may not be retrieved from a lookup table, for example, that contains predetermined permutation sequences. The permutation device 88 may perform permutations, such as inner and/or outer permutations on the data stream based on the permutation sequences computed by the computational circuit 95.

The outer permutation device 85 may be similar to the outer permutation device 45, and may be configured to apply an outer permutation to a data stream. The inner permutation device 90 may be similar to the inner permutation device 40, and may be configured to apply an inner permutation to a data stream. It is noted that the outer permutation device 85 and the inner permutation device 90 may also be different from the outer permutation device 45 and the inner permutation device 40, respectively. The outer permutation device 85 and the inner permutation device 90 may each apply a permutation to a data stream that has already been permuted by the outer permutation device 45 and the inner permutation device 40. It is noted that the decoding device 78 may also be referred to as a coding device 78, because the decoding device 78 may be configured to apply a coding, which may also be referred to as a "decoding," to a data stream.

Still referring to FIG. 2, after the data stream is permuted by the outer permutation device 85 and/or the inner permutation device 90, the data stream may be further processed by the de-resource allocation device 100. The de-resource allocation device 100 may perform a process reverse to the process performed by the resource allocation device 30. Specifically, in each resource unit, data symbols may be de-allocated or separated from the subcarrier frequencies to which the data symbols are allocated. These data symbols may be further de-mapped into data bits through the symbol to bit mapper 105. The data stream containing data bits may further be decoded through the channel decoder 110. For example, the channel decoder 110 may apply a suitable algorithm to remove a coding, such as a turbo code that has been applied to the data stream on the transmitter side, thereby decoding the data stream. The data stream containing decoded data bits may be output through an output interface 115, for example, for wireless transmission. One skilled in the art, by knowing the processes performed by various devices of the system 70 at the receiver side, can implement a corresponding system or a reversed process by various devices of the system 10 at the transmitter side.

Figure 3:
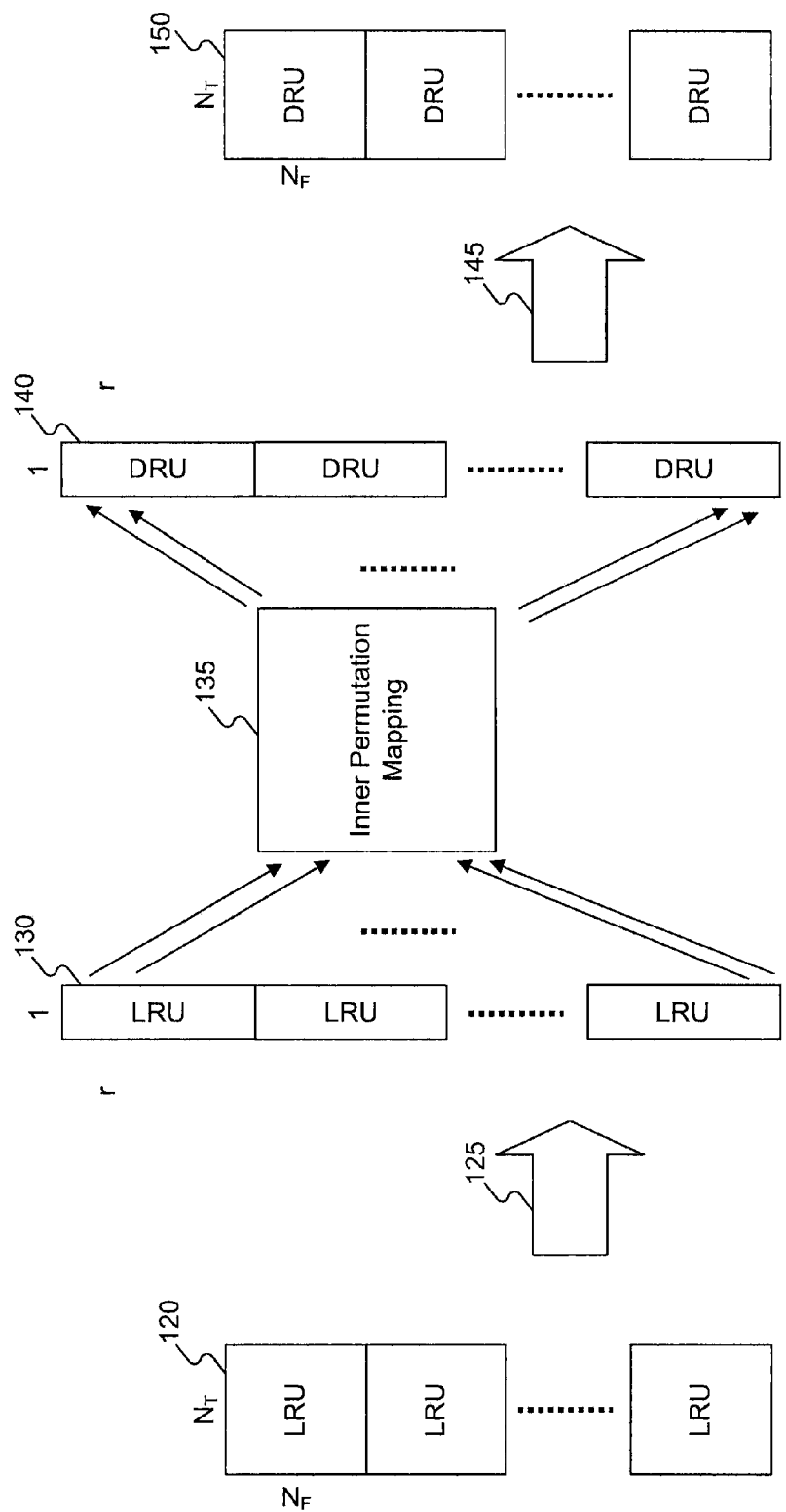
FIG. 3 is a diagrammatic illustration of an inner permutation operation consistent with the disclosed embodiments.

FIG. 3 schematically illustrates an exemplary inner permutation consistent with the disclosed embodiments. The inner permutation illustrated in FIG. 3 may be performed by the inner permutation device 40 of the system 10 on the transmitter side. The exemplary inner permutation is shown to be performed on a first data stream 120 (also referred to as a prior inner permutation group 120), which may include $N_{RU,ip}$ logical resource units (LRUs), where $N_{RU,ip}$ may be an integer number. Each of the $N_{RU,ip}$ LRUs may correspond to an index number, for example, from 0 to $N_{RU,ip}-1$. Each LRU may be in a matrix form, and may include $N_F$ by $N_T$ subcarriers.

An inner permutation 135 may be applied to the first data stream 120. An input to the inner permutation 135 may include one or more second data streams 130. Each of the second data streams 130 may include subcarriers arranged in a vector form, such as a column of size r by 1, r being an integer number. In one embodiment, the first data stream 120 may be rearranged into a single second data stream 130 with r being ($N_T*N_F*N_{RU,ip}$). In such embodiment, each matrix LRU of the first data stream 120 may be rearranged into a column of size ($N_F*N_T$) by 1. In one embodiment, the first data stream 120 may be rearranged into a plurality of second data streams 130. For example, each of the second data streams 130 may correspond to a symbol (i.e., column) of the first data stream 120, with r being $N_T*N_{RU,ip}$. Accordingly, the first data stream 120 may be rearranged into $N_T$ second data streams 130. It is also contemplated that the second data stream 130 may also be in form of one or more row vectors, rather than column vectors.

The inner permutation 135 may perform a permutation at the subcarrier level. That is, the inner permutation 135 may be performed by permuting the subcarriers of the second data stream 130. A permutation sequence may be employed in the inner permutation 135, which will be discussed in details below.

After being processed by the inner permutation 135, the one or more second data streams 130 may be mapped into one or more third data streams 140, each of which may include a plurality of distributed resource units (DRUs). Each of the one or more third data streams 140 may be in a column vector form (or a row vector form) of a size equal to the size of each of the second data streams 130, i.e., r by 1 (or 1 by r). The third data streams 140 may be further rearranged by a process 145 with a predetermined algorithm into a fourth data stream 150. In other words, the process 145 may transform the third data streams 140 from vectors (e.g., columns or rows) into a matrix of size ($N_{RU,ip}*N_F$) by $N_T$. In some embodiments, the fourth data stream 150 may also be referred to as a post inner permutation data group 150 including $N_{RU,ip}$ DRUs.

One skilled in the art may appreciate that the inner permutation illustrated in FIG. 3 may be implemented on the transmitter side of a communication system. A reversed process of the inner permutation shown in FIG. 3 may represent another inner permutation (which may also be referred to as a "de-inner permutation," if desired), which may be implemented on the receiver side of the communication system.

Below equation (1) illustrates an exemplary method to compute a first permutation sequence, which may be employed in an inner permutation on the receiver side of a communication system. It is contemplated that the first permutation sequence determined by equation (1) may also be applied to an inner permutation on the transmitter side of the communication system.

$$Sca_{output}(k,s) = N_{RU,ip}*n_k + \{P_s[n_k \bmod N_{RU,ip}] + \text{PermBase}\} \bmod N_{RU,ip} \quad (1)$$

In equation (1), $Sca_{output}(k,s)$ may stand for a permutation output index number in the resulting permuted data sequence. s may stand for an index number of a resource unit among the total $N_{RU,ip}$ resource units (e.g., DRU or LRU) to be permuted. For example, s may be any integer number from 0 to $N_{RU,ip}-1$. $n_k$ may equal to $(k+13*s) \bmod N_{unit}$, where $N_{unit}$ may be the total number of subcarriers within a resource unit. $N_{unit}$ may be an integer number. k may stand for an index number of a subcarrier within a resource unit, and may be an integer number from 0 to $N_{unit}-1$. $P_s$ may be a data sequence obtained by cyclically shifting a predetermined basic permutation sequence $P_0$ to the left by s times. The result of ($n_k \bmod N_{RU,ip}$) may be an index number for the data sequence $P_s$. For example, if s=0, $P_0 = [1, 2, \ldots, N_{RU,ip}]$, then each element of $P_0$ is $P_0(1)=1, P_0(2)=2$, etc. If s=1, then $P_1$ may be obtained by cyclically shifting $P_0$ to the left by 1 time, thus, $P_1 = [2, 3, \ldots, N_{RU,ip}, 1]$, and $P_1[1]=2, P_1[2]=3$, etc. It is contemplated that $P_s$ may also be obtained by cyclically shifting the predetermined basic permutation sequence $P_0$ to the right by s times. PermBase may be an integer number ranging from 0 to $N_{PermBase}-1$, where $N_{PermBase}$ may be an integer number.

In the prior art, for example, in Reference 1, the basic permutation sequence $P_0$ may be obtained from a lookup table containing a plurality of predetermined sequences for different sequence lengths. This prior art method of obtaining a permutation sequence may require a large number of memories or other storage devices for storing the lookup table in certain applications, such as applications where the communication system supports flexible parameters or flexible sequence lengths. In some instances, this requirement may lead to increased hardware complexity, operational costs, or both.

Consistent with one embodiment of the invention, a permutation sequence may be computed based on a content of the data stream. For example, a permutation sequence may be computed based on at least a length of the data stream. The term "length" refers to a total number of data items (or data units, data groups) in a data sequence. For example, the length of a symbol may be the total number of data bits, and the length of the first data stream 120 may be the total number ($N_{RU,ip}$) of logical resource units (LRUs). A simple equation (such as equation (2)) may be used to generate the basic permutation sequence $P_0$, which, unlike the prior art method, does not require a large number of memories or other storage devices for storing the permutation sequence.

$$P_0(j)=j+1, \text{ where, } j=0,1,\ldots,N_{RU,ip}-1 \qquad (2)$$

For example, based on equation (2), an exemplary basic permutation sequence may be calculated as $P_0=[1, 2, \ldots, N_{RU,ip}]$. The permutation sequences determined by equations (1) and (2) may be computed using a computational circuit (shown in FIG. 5), which may be free of storage memory. In other words, memories or other storage devices may not be required to be included in the computational circuit for computing the permutation sequences using equations (1) and (2).

Permutation sequences generated by equations (1) and (2) may be utilized in an inner permutation on the receiver side of a communication system. It is contemplated that the permutation sequences generated by equations (1) and (2) may also be applied to an inner permutation on the transmitter side of the communication system.

Figure 4:
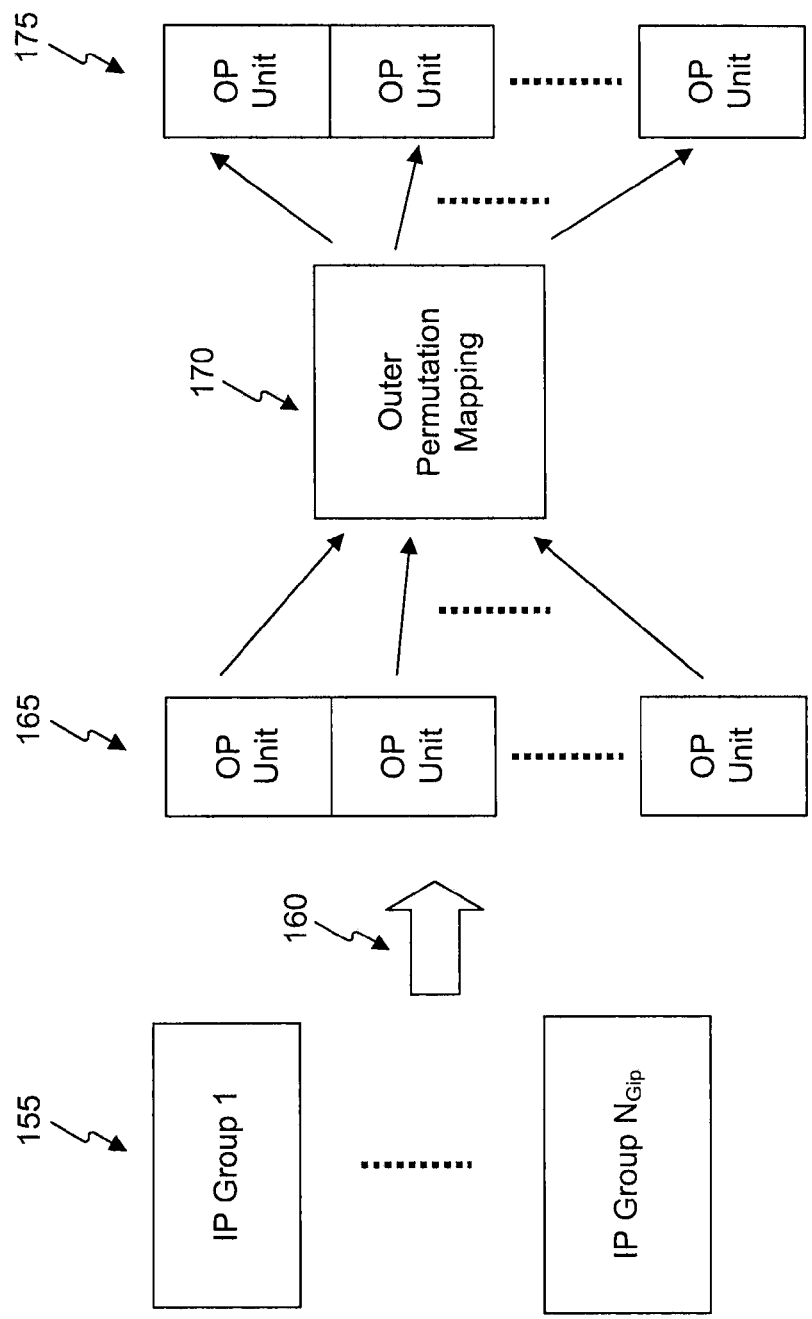
FIG. 4 is a schematic diagram of an exemplary outer permutation operation consistent with the disclosed embodiments.

FIG. 4 illustrates a schematic diagram of an exemplary outer permutation consistent with the disclosed embodiments, which may be performed by the outer permutation device 45 on the transmitter side of a communication system. The outer permutation may be performed on a fifth data stream 155, which may contain a plurality of post inner permutation data groups generated by the inner permutation shown in FIG. 3. The fifth data stream 105 may include, for example, $N_{Gip}$ post inner permutation data groups (IP Group 1 to IP Group $B_{Gip}$), where $N_{Gip}$ may be an integer number. Each post inner permutation data group may be similar to the post inner permutation data group 150 (i.e., the fourth data stream 150) generated by the inner permutation of FIG. 3, and may include $N_{RU,ip}$ distributed resource units (DRUs). Thus, the fifth data stream 155 may include a total number of $N_{RU,op}=N_{Gip}*N_{RU,ip}$ DRUs.

The fifth data stream 155 may be rearranged through a process 160 to formulate a sixth data stream 165. The sixth data stream 165 may include a plurality of outer permutation units (OP Units), each one of the outer permutation units may include at least one DRU. The sixth data stream 165 may also be referred to as a prior outer permutation data group 165. The sixth data stream 165 may be subject to an outer permutation 170 based on an outer permutation sequence. After being permuted by the outer permutation, the sixth data stream 165 may be transformed into a seventh data stream 175, which may also be referred to as a post outer permutation data group 175. The seventh data stream 175 may include a total number of $N_{RU,op}$ PRUs.

One skilled in the art may appreciate that the outer permutation illustrated in FIG. 4 may be implemented on the transmitter side of a communication system. A reversed process of the outer permutation shown in FIG. 3 may represent an alternative outer permutation (which may also be referred to as a "de-outer permutation," if desired), which may be implemented on the receiver side of the communication system.

In prior art, for example, in Reference 1, the outer permutation sequence may be obtained from a lookup table, which stores a plurality of permutation sequences of different lengths. Consistent with one embodiment of the present invention, the outer permutation sequence may be generated by a computational circuit based on at least one content of the data stream to be permuted, such as, for example, a length of the data stream. For example, the following equation (3) may be used to generate a permutation sequence to be used in an outer permutation process.

$$P_{op}(m)=(q(m)\bmod N_\Delta)*N_{Gip}+\text{floor}(q(m)/N_\Delta), \text{ where,}$$
$$m=0,1,\ldots,N_{RU,op}-1, q(m)=m+\text{floor}(r(m)/(N_\Delta-1)), r(m)=\max(m-(N_{RU,op}\bmod N_{Gip})*N_\Delta,0), \text{ and}$$
$$N_\Delta=\text{floor}(N_{RU,op}/N_{Gip}+1) \qquad (3)$$

Permutation sequences determined by equation (3) may be used in an outer permutation on the receiver side of a communication system. It is contemplated that the permutation sequences determined by equation (3) may also be applied to an outer permutation on the transmitter side of the communication system. It is also contemplated that the inner permutation and outer permutation may utilize the same permutation sequence. For example, the permutation sequence determined by equation (3) for the outer permutation may also be used for the inner permutation.

Figure 5:
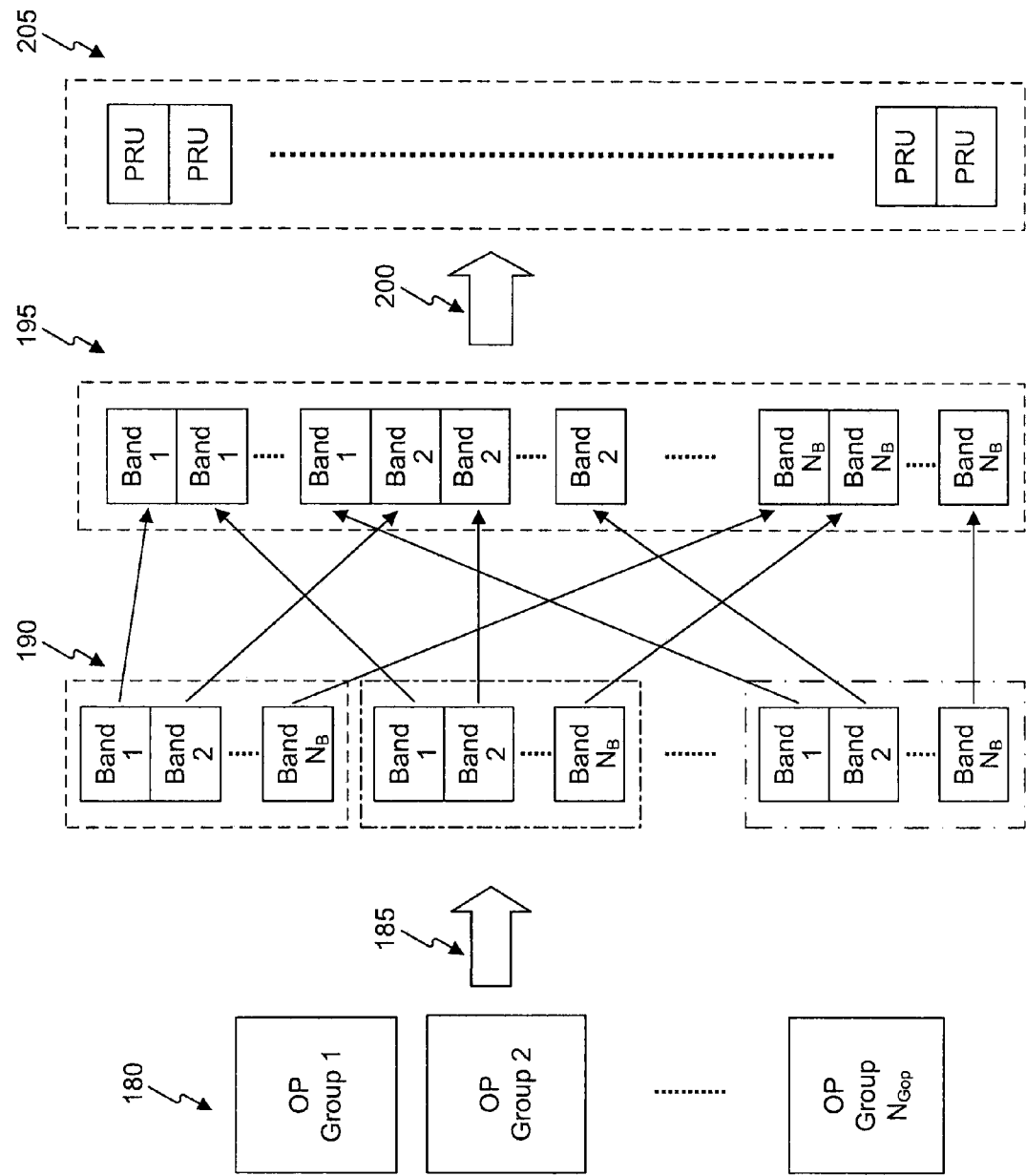
FIG. 5 is a schematic illustration of an exemplary post outer permutation process consistent with the disclosed embodiments.

FIG. 5 illustrates an exemplary post outer permutation process consistent with the disclosed embodiments. The post outer permutation process may be applied to an eighth data stream 180 generated after the outer permutation of FIG. 4. The eighth data stream 180 may include a plurality of post outer permutation data groups, for example, $N_{Gop}$ (OP group 1 through OP group $N_{Gop}$) post outer permutation data groups. Each post outer permutation data group may be similar to the post outer permutation group 175 (i.e., the seventh data stream 175).

The eighth data stream 180 may be rearranged by a process 185 to formulate a ninth data stream 190. Each post outer permutation group (i.e., each of OP group 1, OP group 2, . . . , OP group $N_{Gop}$) may be transformed into a plurality of bands (i.e., Band 1, Band 2, . . . , Band $N_B$), where $N_B$ may be an integer number. Each band, e.g., Band 1, may include a predetermined number of physical resource units (PRUs), for example, $N_1$ PRUs, where $N_1$ may be an integer number.

The ninth data stream 190 may be permuted to generate a tenth data stream 195 based on a predetermined permutation sequence. For example, the ninth data stream 190 may be evenly permuted. Specifically, all Band 1 from all OP groups (i.e., OP group 1, . . . , OP group $N_{Gop}$) may be grouped together in a predetermined order, and may occupy the number 1 to number $N_B$ positions within the tenth data stream 195. In one embodiment, Band 1 from OP group 1 may occupy the number 1 position in the tenth data stream 195, and Band 1 from OP group 2 may occupy the number 2 position, and so on. Similarly, all Band 2 from all OP groups may be grouped together in a predetermined order, and may occupy the number $N_B+1$ to number $2*N_B$ positions in the tenth data stream 195. Other bands (Band 3 through Band $N_B$) may be similarly rearranged, as shown in FIG. 5. It is contemplated that other suitable methods for permuting the bands may be used.

The tenth data stream 195 may be further rearranged by a process 200 to formulate an eleventh data stream 205, which may include a plurality of PRUs arranged in a column or row vector form based on certain sequence. The resource units in physical frequency domain may be allocated with frequency or time diversity for channel coding or decoding. Although shown separately, the process described in FIG. 5 may be integral with the process shown in FIG. 4 and as part of an outer permutation process.

In the prior art, for example, in Reference 1, the permutation sequences for the inner and outer permutations are predetermined and stored in a lookup table, which may require a large number of memories or other storage devices for storing the lookup table. This may increase the hardware complexity of the communication system, particularly, when some system parameters, such as the lengths of data streams, are variable. In the present invention, the permutation sequences may be generated by computational circuits without referring to a lookup table, for example, based on at least one of equations (1)-(3). Because the permutation sequences are computed without relying on any lookup table or similar component containing predetermined sequences, storage memories otherwise required for storing the lookup table in the methods and systems of the prior art, may not be needed in the present invention.

Another exemplary algorithm, which is referred to as a "bit-reversal" process, may be used to compute permutation sequences. For example, the bit-reversal process may be employed to generate the entire first permutation sequence $Sca_{output}$, the data sequence $P_s$, the basic permutation sequence $P_0$, or a permutation sequence to be used in an outer permutation.

Figure 6:
FIG. 6 is an illustration of an exemplary bit-reversal process consistent with the disclosed embodiments.

FIG. 6 illustrates an exemplary bit-reversal process consistent with the disclosed embodiments. For example, for a given initial sequence $A_{in}$=[0, 1, 2, 3, 4, 5, 6, 7], each element of $A_{in}$ may be expressed in a 3-bit binary form. For example, the decimal number 0 may be expressed as 000, the decimal number 1 may be expressed as 001, etc. Each 3-bit binary expression of a decimal number in the initial sequence $A_{in}$ is then reversed based on a predetermined algorithm. For example, the binary expression 001 may be reversed by exchanging the positions of the most significant bit and the least significant bit in the expression to become 100. As a result, decimal number 1 may be transformed into decimal number 4. Applying the bit reversal to all data items of $A_{in}$, $A_{in}$=[0, 1, 2, 3, 4, 5, 6, 7] may be transformed into a bit-reversal sequence $BRO_3$=[0, 4, 2, 6, 1, 5, 3, 7]. The bit-reversal sequence may be generally expressed as $BRO_x$, where x is an integer indicating a total number of binary bits for representing a decimal number. In the above example, x=3. A cyclic shift may be applied to the bit-reversal sequence. For example, the bit-reversal sequence $BRO_x$ may be cyclically shifted to the right for r times, thereby generating a shifted bit-reversal sequence $BRO_{x,r}$, r being an integer number. In the above example, $BRO_3$ may be shifted to the right for 2 times to generate $BRO_{3,2}$=[3, 7, 0, 4, 2, 6, 1, 5]. For illustrative purposes, below discussions focus on shifting a bit-reversal sequence to the right for r times. It is understood that alternatively, a bit-reversal sequence may be shifted to the left for r times.

A conventional bit-reversal process is limited to processing only sequences having a total length that is power of 2, i.e., $L=2^n$, where n is an integer, and L is the total length. In the present disclosure, if $L=2^n$, L is referred to as being "power of 2." Otherwise, L is referred to as not being "power of 2." For example, the total length of the sequence may be 8, which is power of 2, i.e., $2^3$, or the length may be 12, which is not power of 2. The disclosed bit-reversal process of the present invention may be applied to a sequence having any length, including a length that is not power of 2, for example, $L=2^3+1=9$, which is not power of 2.

For example, an initial sequence $S_0$ may have a total length that is not power of 2, such as $L_0$. The sequence $S_0$ may be divided into a first portion $S_1$ having a first length $L_1$, and a residual second portion $S_2$ having a length of $L_2=L_0-L_1$. It is noted that although the length $L_0$ may not be power of 2, each individual length $L_1$ and $L_2$ may be power of 2. The disclosed bit-reversal process may apply a bit-reversal algorithm to the first portion $S_1$ to generate a bit-reversal sequence $BRO_x$, and may subsequently apply a cyclical shift (shifting $BRO_x$ to the right for r times or to the left for r times) to generate a shifted bit-reversal sequence $BRO_{x,r}$. The disclosed bit-reversal process may generate a third sequence $S_3$, which may have the same length as $S_0$. Each data item of the first sequence $S_1$ and the second sequence $S_2$ may be individually mapped (i.e., permuted) into positions within the third sequence $S_3$. The mapping (i.e., permutation) may be based on at least one of the bit-reversal sequence $BRO_x$ and the shifted bit-reversal sequence $BRO_{x,r}$. For example, the position of each data item of the second portion $S_2$ in the permuted sequence $S_3$ may be determined based on at least a portion of the bit-reversal sequence $BRO_x$, or at least a portion of the shifted bit-reversal sequence $BRO_{x,r}$. After the positions of the data items of the second portion $S_2$ are determined, the data items of the first portion $S_1$ may take the remaining positions of the permuted sequence $S_3$. The position of each data item of the first portion $S_1$ among the remaining positions of permuted sequence $S_3$ may be determined based on the bit-reversal sequence $BRO_x$, or the shifted bit-reversal sequence $BRO_{x,r}$. Details of the disclosed bit-reversal process will be discussed below.

The initial sequence $A_{in}$ may be at least a portion of a resource unit (RU) sequence, such as, for example, an LRU sequence, a DRU sequence, or a PRU sequence. The initial sequence $A_{in}$ may be created based on any given initial sequence, for example, a sequence that is to be permuted, such as, first data stream 120 or second data stream 130. In one embodiment, the initial sequence $A_{in}$ may be created based on the length (i.e., total number of data items, data units, or data groups) of the sequence to be permuted. Let $L_{DRU}$ stand for the length of the initial sequence $A_{in}$, or in other words, the total number of data groups within the initial sequence $A_{in}$. The length $L_{DRU}$ may be the same as the length of the sequence to be permuted or may be derived from the length of the sequence to be permuted.

In one embodiment, the following equations (4)-(6) may be used to compute a plurality of system parameters (e.g., x, y, q, and r listed below) used in a bit-reversal process.

$$x = \text{floor}(\log_2 L_{DRU}) \quad (4)$$

$$y=x-1, q=0, \text{ if } (\log_2 L_{DRU} \bmod 2)=0; \text{ or } y=x, q=1, \text{ if } (\log_2 L_{DRU} \bmod 2)\neq 0 \quad (5)$$

$$r = (\text{cellid}*47) \bmod L_{DRU} \quad (6)$$

The functions floor ( ), mod( ) and $\log_2$( ) are well known mathematical functions. The expression "if $(\log_2 L_{DRU} \bmod 2)=0$" means that if the length $L_{DRU}$ is power of 2, and the expression "if $(\log_2 L_{DRU} \bmod 2)\neq 0$" means that "if the length $L_{DRU}$ is not power of 2." The parameter cellid is an id number of a base station in a communication system, and may be pre-assigned or dynamically assigned by the communication system.

Consistent with one embodiment of the present disclosure, the bit-reversal process may first compute the above system parameters and determine an initial sequence, for example, according to $A_{in}$=[0, 1, . . . , $2^y-1$]. Then the bit-reversal process may generate a bit-reversal sequence $BRO_x$ and a shifted bit-reversal sequence $BRO_{x,r}$ by cyclically shifting the bit-reversal sequence $BRO_x$ to the right by r times. It is understood that the shifted bit-reversal sequence $BRO_{x,r}$ may also be obtained by cyclically shifting the bit-reversal sequence $BRO_x$ to the left by r times. The bit-reversal process may also generate a non-bit-reversal sequence $Seq_{NB}$ based on, for example, the following equation:

$$Seq_{NB} = \{2^y, 2^y+1, \ldots, L_{DRU}-1\} \quad (7)$$

The bit-reversal process may further compute an offset value $O_{NB}$, for example, based on the following equation:

$$O_{NB} = q*[\text{cellid}*29) \bmod (\text{length}(Seq_{NB})+1)] \quad (8)$$

Length(Seq$_{NB}$) stands for the length of the non-bit-reversal sequence Seq$_{NB}$. Let Perm_seq denote a final permutation sequence to be generated by the bit-reversal process. The non-bit-reversal sequence Seq$_{NB}$ may be inserted into a first portion of the final permutation sequence Perm_seq according to the following equation:

$$\text{Perm\_seq}\{BRO_{x,r}(z)+O_{NB}\}=\text{Seq}_{NB}(z), z=\{0,\ldots,\text{length}(\text{Seq}_{NB})-1\} \quad (9)$$

In equation (9), $BRO_{x,r}(z)+O_{NB}$ determines the index of a position within the final permutation sequence Perm_seq, and Seq$_{NB}(z)$ determines which data item of Seq$_{NB}$ is to be mapped to the position within the final permutation sequence Perm_seq.

The shifted bit-reversal sequence $BRO_{x,r}$ may be inserted into a second portion of the final permutation sequence Perm_seq according to the following equation:

$$\text{Perm\_seq}\{I(w)\}=BRO_{x,r}(w), \text{ where, } w=0,\ldots,2^y-1, \text{ and } I=\{0,1,\ldots,L_{DRU}-1\}-\{BRO_{x,r}(z)+O_{NB}\} \quad (10)$$

It is contemplated that the final permutation sequence Perm_seq may also be obtained by first inserting the shifted bit-reversal sequence $BRO_{x,r}$ and then inserting the non-bit-reversal sequence Seq$_{NB}$.

The following example illustrates the disclosed bit-reversal process for generating the final permutation sequence Perm_seq based on a first initial sequence $A_{DRU}$=[0, 1, 2, 3, 4, 5, 6, 7, 8, 9, 10, 11]. The first initial sequence $A_{DRU}$ may be an LRU sequence, a DRU sequence, or a PRU sequence, and may be obtained based on a data sequence to be permuted, e.g., first data stream 120 or second data stream 130. For example, the first initial sequence may be the same as the data sequence to be permuted, a portion of the data sequence to be permuted, or may be derived based on the data sequence to be permuted. The length of $A_{DRU}$ is $L_{DRU}$=12. For illustrative purposes, the length $L_{DRU}$=12 is not power of 2, in other words, ($\log_2 L_{DRU}$ mod 2)≠0. Let cellid be 1. System parameters x, y, q, and r may be calculated from equations (4)-(6) as follows: x=floor($\log_2 L_{DRU}$)=3, y=x=3 and q=1, and r=(cellid*47)mod $L_{DRU}$=11.

A second initial sequence $A_{in}$ for generating a bit-reversal sequence may be determined as: $A_{in}$={0, 1, ..., $2^y$-1}={0, 1, ..., 7}, which may be a portion of the first initial sequence $A_{DRU}$. The length of $A_{in}$ may be of power of 2. The bit-reversal sequence $BRO_x$ may be generated as $BRO_x$=$BRO_3$=[0, 4, 2, 6, 1, 5, 3, 7] using, for example, the bit-reversal process illustrated in FIG. 6. Thus, a shifted bit-reversal sequence $BRO_{x,r}$=$BRO_{3,11}$=[6, 1, 5, 3, 7, 0, 4, 2] may be obtained by cyclically rotating $BRO_3$ to the right by 11 times. The non-bit reversal sequence Seq$_{NB}$ may be generated as Seq$_{NB}$={$2^y$, $2^y$+1, ..., $L_{DRU}$-1}={8, 9, 10, 11}. The offset value may be calculated as $O_{NB}$=q*[cellid*29)mod(length(Seq$_{NB}$)+1)]=4.

The non-bit-reversal sequence Seq$_{NB}$ may be inserted into the final permutation sequence Perm_seq according to equation (9). From z={0, 1, 2, 3}, $BRO_{3,11}(z)+O_{NB}$={10, 5, 9, 7}, the following elements of the final permutation sequence Perm_seq may be determined from equation (9) as: Perm_seq{10}=Seq$_{NB}$(0)=8, Perm_seq{5}=Seq$_{NB}$(1)=9, Perm_seq{9}=Seq$_{NB}$(2)=10, and Perm_seq {7}=Seq$_{NB}$(3)=11. The remaining elements of the final permutation sequence Perm_seq may be determined by inserting the shifted bit-reversal sequence $BRO_{3,11}$ into the Perm_seq sequence according to equation (10).

According to equation (10), w=0, ..., $2^y$-1=0, 1, ..., 7; I={0, 1, ..., 11}-{$BRO_{x,r}(z)+O_{NB}$}={0, 1, ..., 11}-{10, 5, 9, 7}={0, 1, 2, 3, 4, 6, 8, 11}. Thus, Perm_seq{I(0)}=Perm_seq{0}=$BRO_{x,r}$(0)=6, Perm_seq{1}=$BRO_{x,r}$(1)=1, Perm_seq{2}=$BRO_{x,r}$(2)=5, Perm_seq{3}=$BRO_{x,r}$(3)=3, Perm_seq{4}=$BRO_{x,r}$(4)=7, Perm_seq{6}=$BRO_{x,r}$(5)=0, Perm_seq{8}=$BRO_{x,r}$(6)=4, Perm_seq{11}=$BRO_{x,r}$(7)=2. Combining the above determined Perm_seq{10}, Perm_seq{5}, Perm_seq{9}, and Perm_seq{7}, the final permutation sequence Perm_seq may be expressed as: Perm_seq={6, 1, 5, 3, 7, 9, 0, 11, 4, 10, 8, 2}.

Figure 7:
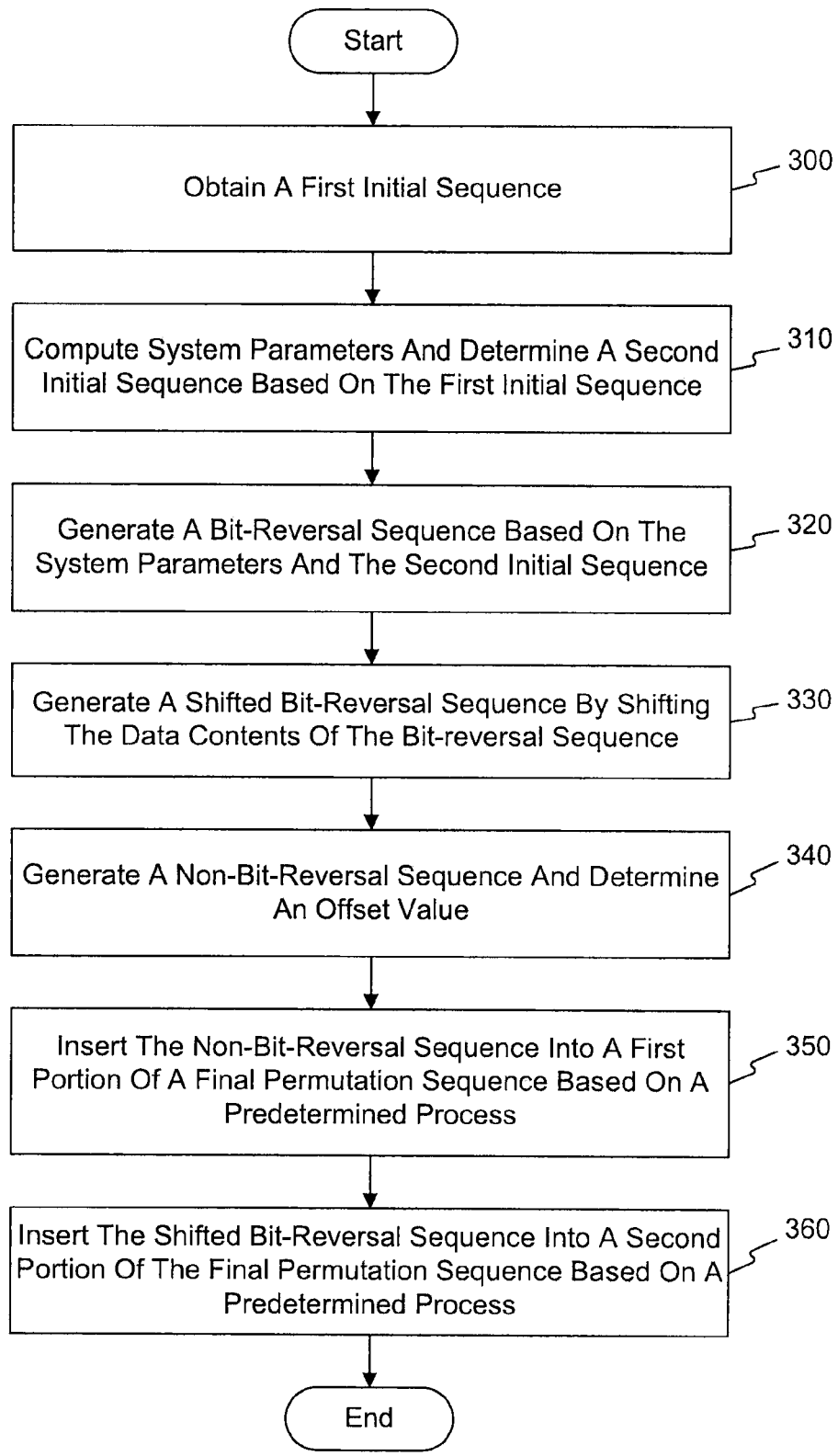
FIG. 7 is a block diagram of an exemplary bit-reversal process consistent with the disclosed embodiments.

FIG. 7 illustrates a block diagram showing an exemplary bit-reversal process for generating the final permutation sequence Perm_seq consistent with the disclosed embodiments. At Step 300, a first initial sequence, such as, $A_{DRU}$ in the above example, may be obtained. System parameters may be calculated based on the first initial sequence $A_{DRU}$, and a second initial sequence, such as $A_{in}$, may also be determined based on the first initial sequence $A_{DRU}$ (Step 310). In one embodiment, the second initial sequence $A_{in}$ may be determined based on the system parameters. The system parameters may include the above mentioned x, r, y, q, etc. A bit-reversal sequence, for example, $BRO_x$ may be generated based on the system parameters and the second initial sequence $A_{in}$ (Step 320). A shifted bit-reversal sequence $BRO_{x,r}$ may be generated based on the bit-reversal sequence $BRO_x$ by cyclically shifting the data contents of the bit-reversal sequence $BRO_x$ to the right by r times (Step 330). The shifted bit-reversal sequence $BRO_{x,r}$ may also be generated by cyclically shifting the data contents of the bit-reversal sequence $BRO_x$ to the left by r times. A non-bit-reversal sequence Seq$_{NB}$ may be generated based on the system parameters and an offset value $O_{NB}$ may be determined (Step 340). The generation of the non-bit-reversal sequence Seq$_{NB}$ may occur at any suitable time after Step 310, for example, before the generation of the bit-reversal sequence $BRO_x$.

The final permutation sequence Perm_seq may be generated by inserting the non-bit-reversal sequence Seq$_{NB}$ into a first portion of the final permutation sequence Perm_seq (Step 350), and inserting the shifted bit-reversal sequence $BRO_{x,r}$ into a second portion of the final permutation sequence Perm_seq (Step 360). The order of Steps 350 and 360 may be exchanged. That is, the shifted bit-reversal sequence $BRO_{x,r}$ may be inserted into the final permutation sequence Perm_seq before the non-bit reversal sequence Seq$_{NB}$ is inserted into the final permutation sequence Perm_seq. After Step 360 is completed, the complete final permutation sequence Perm_seq may be created.

In one embodiment, a cyclic shift may also be applied to the non-bit-reversal sequence Seq$_{NB}$. Below equations may be used to calculate the system parameters:

$$r=\text{mod}(UL\_PermBase,2^y) \quad (11)$$

$$r_{NB}=\text{floor}(UL\_PermBase/2^y) \quad (12)$$

$$O_{NB}=q*\text{mod}(UL\_PermBase,\text{length}(\text{Seq}_{NB})+1) \quad (13)$$

$$x=\text{floor}(\log_2 L_{DRU}) \quad (14)$$

$$y=x-1, q=0, \text{ if }(\log_2 L_{DRU} \text{ mod } 2)=0 \text{ and } \log_2 L_{DRU}>2; \text{ or } y=x, q=1, \text{ if }(\log_2 L_{DRU} \text{ mod } 2)\neq 0 \text{ or } \log_2 L_{DRU}\leq 2. \quad (15)$$

UL_PermBase is a predetermined parameter, which may be associated with the base stations within the communication system. r may be used in cyclically shifting the bit-reversal sequence $BRO_x$. The bit-reversal sequence $BRO_x$ may be cyclically shifted to the right by r times to generate a shifted bit-reversal sequence $BRO_{x,r}$. Alternatively, the bit-reversal sequence $BRO_x$ may be cyclically shifted to the left by r times. $r_{NB}$ may be used in cyclically shifting the non-bit-reversal sequence $Seq_{NB}$, which may be referred to as an intermediate non-bit-reversal sequence. The intermediate non-bit-reversal sequence $Seq_{NB}$ may be cyclically shifted to the right by $r_{NB}$ times to generate a shifted non-bit-reversal sequence $Seq_{NB},r_{NB}$. Alternatively, non-bit-reversal sequence $Seq_{NB}$ may be cyclically shifted to the left by $r_{NB}$ times. The shifted non-bit-reversal sequence $Seq_{NB},r_{NB}$ may then be used in a process similar to those shown in equations (9) and (10), and FIG. 7 to generate the final permutation sequence Perm_seq. When employing equations (9) and (10), $Seq_{NB}$, $r_{NB}$ may replace $Seq_{NB}$ in generating the final permutation sequence Perm_seq.

The disclosed bit-reversal process may allow extended usage of a bit-reversal sequence $BRO_x$. For example, the disclosed bit-reversal process may apply a cyclic shift to the bit-reversal sequence $BRO_x$. The disclosed bit-reversal process may also apply operations to one or more bit-reversal sequence. For example, two or more bit-reversal sequences may be added, multiplied, or subtracted to generate a new bit-reversal sequence. The bit-reversal sequence $BRO_x$ may be used in a mod( ) function or a division function with respect to a predetermined integer to generate a new sequence. A portion or selected portions of the bit-reversal sequence $BRO_x$ may be extracted and used as a permutation sequence.

The disclose bit-reversal process may be used to generate a permutation sequence. In one embodiment, the bit-reversal process may be used to generate a permutation sequence for use in the inner permutation and/or the outer permutation. In one embodiment, the bit-reversal process itself may be employed as a permutation process in the inner and/or outer permutation for permuting a data sequence.

Figure 8B:
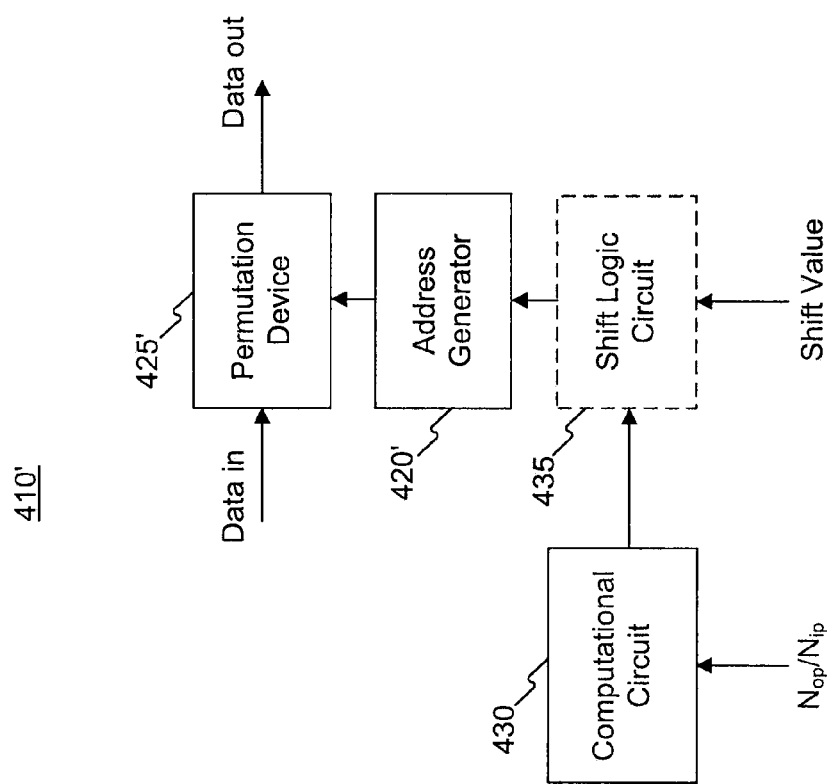
FIG. 8B is a schematic illustration of an exemplary hardware architecture for implementing permutation methods consistent with the disclosed embodiments.
Figure 8A:
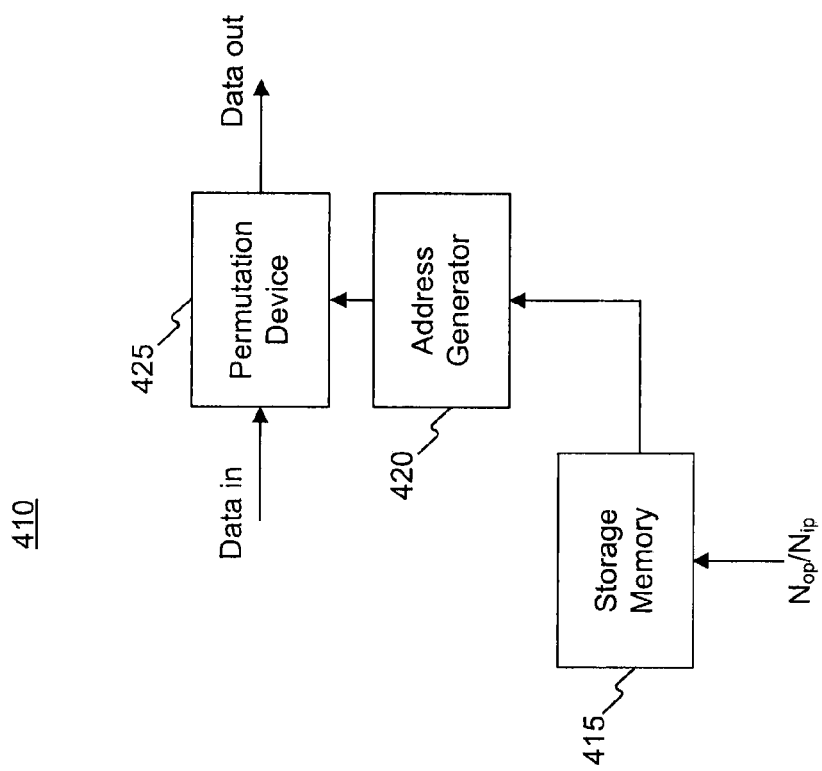
FIG. 8A is a schematic illustration of an exemplary hardware architecture for implementing permutation methods.

FIG. 8A illustrates an exemplary hardware architecture 410 for implementing a permutation method, such as one disclosed in the prior art. As shown in FIG. 8A, the hardware architecture 410 for such method may include a permuting device 425, in which input data streams may be permuted according to one or more predetermined permutation sequences. Permutation device 425 may include devices known in the art, for example, a memory and/or a processing unit for performing permutations. An address generator 420 may be configured to provide address information to the permuting device 425 for the permuting data streams. The hardware architecture 410 may further include a storage memory 415 (or other storage devices) for storing one or more lookup tables that contain predetermined permutation sequences. When a data stream is received, one of the predetermined permutation sequences may be selected from the lookup tables based on the length of the received data stream that is to be permuted or based on parameters, for example, $N_{op}$ and $N_{ip}$ related to outer and inner permutations.

FIG. 8B illustrates an exemplary hardware architecture 410' for implementing a permutation method consistent with the disclosed embodiments for generating permutation sequences. The hardware architecture 410' may include a permutation device 425', which may be similar to the permutation device 425 of FIG. 6A, and/or the permutation device 35 shown in FIG. 1. The permutation devices 425 or 425' may also be similar to the permutation device 88 of FIG. 2. The permutation devices 425' may be configured to apply a permutation to a data stream. The hardware architecture 410' may include an address generator 420', which may be similar to the address generator 420 of FIG. 8A. The hardware architecture 410' may also include a computational circuit 430 configured to generate permutation sequences for the inner and/or the outer permutations according to a computational process, such as, for example, at least one of equations (1)-(15). The computational circuit 430 may be free of storage memory. In other words, unlike the hardware architecture 410 of FIG. 8A for implementing the prior art method, the computational circuit 430 of FIG. 8B for implementing a permutation method consistent with the disclosed embodiments may not include any storage memory (or other storage devices) for storing permutation sequences. As a result, the complexity of the hardware architecture 410' for implementing the disclosed methods for data permutation may be significantly reduced.

In some embodiments, the hardware architecture 410' may include a shift logic circuit 435 located downstream of the computational circuit 430. The shift logic circuit 435 may be configured to shift data contents of the permutation sequences generated by the computational circuit 430 before the permutation sequences are used for permuting data streams. In some embodiments, shift logic circuit 435 may be integral with the computational circuit 430, or may be omitted. The hardware architecture 410' for implementing permutation methods consistent with the present disclosure may be part of the system 10 shown in FIG. 1 on the transmitter side of a communication system, or part of the system 70 shown in FIG. 2 on the receiver side of the communication system.

In one embodiment, permutation sequences are non-predetermined, and are computed using computational circuits based on at least one of the equations (1)-(15) and/or the disclosed bit-reversal process when conducting inner and/or outer permutations. The permutation sequences may not be stored in a lookup table. When system parameters of the communication system are changed, the permutation sequences may be re-calculated by the computational circuit 430 based on the changed system parameters. The permutation device 425' may obtain a re-calculated permutation sequence from the computational circuit 430 and apply the permutation sequence in the inner and/or outer permutations.

In one embodiment, non-predetermined permutation sequences may be computed using computational circuits, and may be stored in an intermediate lookup table that in turn may be stored in a memory. The memory for storing the lookup table may be part of the permutation device 425'. The intermediate lookup table may be re-configurable, dynamic, or updatable. The permutation sequences may be computed by the computational circuit 430 based on at least one of the equations (1)-(15) and the disclosed bit-reversal process. The permutation device 425' may obtain a permutation sequence from the intermediate lookup table and apply the permutation sequence to permute a data stream. The permutation sequences stored in the intermediate lookup table may be updated. For example, when system parameters are changed, the computational circuit 430 may re-calculate the permutation sequences based on the changed system parameters. The re-calculated permutation sequences may be stored in the intermediate lookup table, thereby re-configuring or updating the intermediate lookup table. The permutation device may obtain a permutation sequence, which may be updated, from the updated or re-configured intermediate lookup table and apply the permutation sequence to permute the data stream.

The disclosed methods and systems may be employed in wireless communication systems or other systems where data permutation may be performed. For example, the disclosed methods and systems for data permutation may be implemented in the receiver side of a communication system. The disclosed methods and systems may also be implemented in the transmitter side of a communication system. The disclosed methods for generating data permutation sequences may be implemented using computational circuits without relying on lookup tables or other components that store predetermined permutation sequences. The disclosed embodiments, in some applications, may reduce or eliminate the need of additional memories or other storage devices for storing predetermined permutation sequences. The disclosed methods and systems for data permutation may reduce the complexity of the hardware architecture of a communication system and/or may improve the performance of the communication system. In some applications, the disclosed methods for generating data permutation sequences may be implemented using computational circuits and may store the computed data permutation sequences in an intermediate lookup table, which may be re-configured or updated using re-calculated permutation sequences computed by a computational circuit.

It will be apparent to those skilled in the art that various modifications and variations can be made to the disclosed method and system for data permutation in a communication system. It is intended that the specification and examples be considered as exemplary only, with a true scope of the disclosure being indicated by the following claims and their equivalents.

What is claimed is:

1. A wireless communication method, comprising:
   receiving a first data stream comprising a data sequence;
   computing a permutation sequence based on a content of the received first data stream, the permutation sequence being a non-predetermined sequence; and
   performing a permutation on the first data stream based on the permutation sequence to generate a permuted first data stream being configured for wireless transmission,
   wherein computing the permutation sequence comprises generating a bit-reversal sequence based on the first data stream,
   wherein computing the permutation sequence comprises:
      computing the permutation sequence based on:
         a first predetermined integer number associated with a prior outer permutation data group;
         a second predetermined integer number associated with a plurality of post inner permutation data groups; and
         as third predetermined integer number associated with the first predetermined integer number and the second predetermined integer number, the third predetermined integer number being, at least in part, directly related to the first predetermined integer number and inversely related to the second predetermined integer number.

2. The wireless communication method of claim 1, wherein computing the permutation sequence based or the content of the first data stream includes computing the permutation sequence based on at least a length of the data sequence.

3. The wireless communication method of claim 1, wherein computing the permutation sequence comprises computing the permutation sequence using a computational circuit without relying on a lookup table containing predetermined permutation sequences.

4. The wireless communication method of claim 1, wherein computing the permutation sequence comprises computing a basic permutation sequence $P_0$ based on the following equation: $P_0(j)=j+1$, wherein, $j=0, 1, \ldots, N_{RU,ip}-1$, and wherein $N_{RU,ip}$ is a predetermined integer number.

5. The wireless communication method of claim 1, wherein performing the permutation comprises performing an outer permutation on the prior outer permutation data group, the prior outer permutation data group including the plurality of post inner permutation data groups generated by an inner permutation, the outer permutation being performed based on a second permutation sequence $P_{op}$ computed based on the following equation:

$$P_{op}(m)=(q(m)\bmod N_\Delta)*N_{Gip}+\mathrm{floor}(q(m)/N_\Delta),$$

wherein $m=0, 1, \ldots, N_{RU,op}-1$, $q(m)=m+\mathrm{floor}\,(r(m)/(N_\Delta-1))$, $r(m)=\max(m-(N_{RU,op}\bmod N_{Gip})*N_\Delta, 0)$, and $N_\Delta=\mathrm{floor}\,(N_{RU,op}/N_{Gip}+1)$ and wherein $N_{RU,op}$ is the first predetermined integer number associated with the prior outer permutation data group, $N_{Gip}$ is the second predetermined integer number associated with the plurality of post inner permutation data groups included within the prior outer permutation data group, and $N_\Delta$ is the third predetermined integer number associated with the first predetermined integer number and the second predetermined integer number.

6. The wireless communication method of claim 1, wherein computing the permutation sequence comprises computing the permutation sequence based on the following equation:

$$P_{op}(m)=(q(m)\bmod N_\Delta)*N_{Gip}+\mathrm{floor}(q(m)/N_\Delta),$$

wherein $m=0, 1, \ldots, N_{RU,op}-1$, $q(m)=m+\mathrm{floor}\,(r(m)/(N_\Delta-1))$, $r(m)=\max(m-(N_{RU,op}\bmod N_{Gip})*N_\Delta, 0)$ and $N_\Delta=\mathrm{floor}\,(N_{RU,op}/N_{Gip}+1)$, and wherein $N_{RU,op}$ is the first predetermined integer number associated with the prior outer permutation data group, $N_{Gip}$ is the second predetermined integer number associated with the plurality of post inner permutation data groups, and $N_\Delta$ is the third predetermined integer number associated with the first predetermined integer number and the second predetermined integer number.

7. The wireless communication method of claim 1, wherein computing the permutation sequence further comprises:
   shifting data contents within the bit-reversal sequence;
   generating a non-bit-reversal sequence based on the first data stream;
   creating the permutation sequence by inserting the non-bit-reversal sequence into a first portion of the permutation sequence; and
   inserting the shifted bit-reversal sequence into a second portion of the permutation sequence.

8. The wireless communication method of claim 7, further comprising obtaining a first initial sequence based on the first data stream.

9. The wireless communication method of claim 8, further comprising computing a plurality of system parameters and generating a second initial sequence based on the first initial sequence, wherein generating the bit-reversal sequence comprises generating the bit-reversal sequence based on the system parameters and the second initial sequence.

10. The wireless communication method of claim 7, further comprising computing an offset value, and wherein inserting the non-bit-reversal sequence comprises inserting the non-bit-reversal sequence based on the shifted bit-reversal sequence and the offset value.

11. The wireless communication method of claim 7, wherein shifting data contents comprises cyclically shifting data contents to the right by r times, r being an integer number.

12. The wireless communication method of claim 7, wherein the non-bit-reversal sequence is a shifted non-bit-reversal sequence, and wherein generating the non-bit-reversal sequence comprises:
generating an intermediate non-bit-reversal sequence; and
cyclically shifting the intermediate non-bit-reversal sequence to the right by $r_{NB}$ times to generate the shifted non-bit-reversal sequence, $r_{NB}$ being an integer number, wherein inserting the non-bit-reversal sequence comprises inserting the shifted non-bit-reversal sequence.

13. The wireless communication method of claim 1, wherein computing the permutation sequence comprises:
receiving an initial data sequence generated based on the first data stream, the initial data sequence having a total length;
dividing the initial data sequence into a first subsequence having a first length and a second subsequence having a second length, the sum of the first and second length being the total length;
allocating data items of the second subsequence to a first portion of the permutation sequence;
applying a bit-reversal operation to the first subsequence;
generating the bit-reversal sequence based on the first subsequence; and
allocating data items of the bit-reversal sequence to a second portion of the permutation sequence.

14. The wireless communication method of claim 13, wherein the total length is an integer number that is power of integer number 2.

15. The wireless communication method of claim 13, wherein the total length is an integer number that is not power of integer number 2.

16. The wireless communication method of claim 1, further comprising:
storing the computed permutation sequence in an intermediate lookup table, the intermediate lookup table being re-configurable;
re-calculating the permutation sequence when system parameters are changed; and
updating the intermediate lookup table using the re-calculated permutation sequence,
wherein the system parameters comprise the first predetermined integer number associated with the prior outer permutation data group, and the second predetermined integer number associated with the plurality of post inner permutation data groups.

17. The wireless communication method of claim 16, further comprising obtaining the permutation sequence from the intermediate lookup table for performing the permutation.

18. A system for wireless communication, comprising:
an input interface configured to receive an input of a first data stream, the first data stream comprising at least one data sequence;
a coding device configured to apply a permutation on the first data stream based on a permutation sequence, the coding device comprising:
a computational circuit configured to compute the permutation sequence based on a content of the at least one data sequence of the first data stream, the computed permutation sequence being a non-predetermined sequence; and
a permutation device configured to apply the permutation to the first data stream based on the permutation sequence; and
an output interface configured to output the permuted first data stream,
wherein the computational circuit is further configured to compute the permutation sequence based on a bit-reversal process, wherein the bit-reversal process comprises:
generating a bit-reversal sequence based on the first data stream;
shifting data contents within the bit-reversal sequence;
generating a non-bit-reversal sequence based on the first data stream;
creating the permutation sequence by inserting the non-bit-reversal sequence into a first portion of the permutation sequence; and
inserting the shifted bit-reversal sequence into a second portion of the permutation sequence.

19. The system of claim 18, further comprising a shift logic circuit located downstream of the computational circuit and being configured to receive the computed permutation sequence from the computational circuit and shift data contents of the permutation sequence.

20. The system of claim 18, the computational circuit is free of storage memory.

21. The system of claim 18, wherein the computational circuit is configured to compute the permutation sequence based on the content of the at least one data sequence of the first data stream without relying on a lookup table containing predetermined permutation sequences.

22. The system of claim 18, wherein the computational circuit is configured to compute the permutation sequence based on at least a length of the at least one data sequence of the first data stream.

23. The system of claim 18, wherein the system is a system on a transmitter side, the system further comprising at least one of a channel encoder, a bit to symbol mapper, and a resource allocation device.

24. The system of claim 18, wherein the system is a system on a receiver side, the system further comprising at least one of a channel decoder, a symbol to bit mapper, and a de-resource allocation device.

25. The system of claim 18, wherein the computational circuit is further configured to compute a first permutation sequence based on the following equation:

$$Sca_{output}(k,s)=N_{RU,ip}*n_k+\{P_s[n_k \bmod N_{RU,ip}]+ PermBase\} \bmod N_{RU,ip}$$

wherein $Sca_{output}(k,s)$ for a permutation output index in a second data stream generated by the permutation, k stands for an integer number from 0 to $N_{unit}$, $N_{unit}$ being a predetermined integer number associated with the first data stream to be permuted, and s stands for an integer number from 0 to $N_{RU,ip}$, $n_k$ equals to (k+13*s) mod $N_{unit}$, $P_s$ is a data sequence obtained by shifting a basic permutation sequence $P_0$ cyclically to the left s times, and PermBase is a predetermined number, and
wherein the permutation device is further configured to apply an inner permutation on the first data stream based on the first permutation sequence, and generate a post inner permutation data group.

26. The system of claim 25, wherein the computational circuit is configured to compute the basic permutation sequence $P_0$ based on the following equation:
$P_0(j)=j+1$, wherein, $j=0, 1, \ldots, N_{RU,ip}-1$, and wherein $N_{RU,ip}$ is a predetermined integer number.

27. The system of claim 25, wherein the computational circuit is further configured to compute a second permutation sequence based on the following equation:
$P_{op}(m)=(q(m) \bmod N_A)*N_{Gip}+floor (q(m)/N_A)$, wherein $m=0, 1, \ldots, N_{RU,op}-1$, $q(m)=m+floor (r(m)/(N_A-1))$, $r(m)=max(m-(N_{RU,op} \bmod N_{Gip})*N_A,0)$, and $N_A=floor$ ($N_{RU,op}/N_{Gip}+1$), and wherein $N_{RU,op}$ and $N_{Gip}$ are predetermined integer numbers.

28. The system of claim 26, wherein the computational circuit is further configured to compute a second permutation sequence based the following equation:

$P_{op}(m)=(q(m) \bmod N_A)*N_{Gip}+\text{floor}(q(m)/N_A)$, wherein $m=0, 1, \ldots, N_{RU,op}-1$, $q(m)=m+\text{floor}(r(m)/(N_A-1))$, $r(m)=\max(m-(N_{RU,op} \bmod N_{Gip})*N_A, 0)$, and $N_A=\text{floor}(N_{RU,op}/N_{Gip}+1)$, and wherein $N_{RU,op}$ and $N_{Gip}$ are predetermined integer numbers, and wherein the permutation device is further configured to apply an outer permutation on a prior outer permutation data group containing a plurality of post inner permutation data groups based on the permutation sequence computed by the computational circuit.

29. The system of claim 18, wherein the computational circuit is further configured to compute a permutation sequence based on the following equation:

$P_{op}(m)=(q(m) \bmod N_A)*N_{Gip}+\text{floor}(q(m)/N_A)$, wherein $m=0, 1, \ldots, N_{RU,op}-1$, $q(m)=m+\text{floor}(r(m)/(N_A-1))$, $r(m)=\max(m-(N_{RU,op} \bmod N_{Gip})*N_A, 0)$, and $N_A=\text{floor}(N_{RU,op}/N_{Gip}+1)$, and wherein $N_{RU,op}$ and $N_{Gip}$ are predetermined integer numbers.

30. The system of claim 18, wherein the bit-reversal process further comprises generating a first initial sequence based on the at least one data sequence of the first data stream.

31. The system of claim 30, wherein the bit-reversal process further comprises computing a plurality of system parameters and creating a second initial sequence based on the first initial sequence, wherein generating the bit-reversal sequence comprises generating the bit-reversal sequence based on the system parameters and the second initial sequence.

32. The system of claim 18, wherein the bit-reversal process further comprises computing an offset value, and wherein inserting the non-bit-reversal sequence comprises inserting the non-bit-reversal sequence based on the shifted bit-reversal sequence and the offset value.

33. The system of claim 18, wherein the permutation device is configured to apply an inner permutation on the first data stream based on the permutation sequence computed from the bit-reversal process.

34. A wireless communication method, comprising:
receiving a first data stream comprising a data sequence;
computing a permutation sequence based on at least a length of the received first data stream using a computational circuit without relying on a lookup table containing predetermined permutation sequences; and
performing a permutation on the first data stream based on the permutation sequence to generate a permuted first data stream being configured for wireless transmission,
wherein performing the permutation comprises performing an outer permutation on a prior outer permutation data group, the prior outer permutation data group including a plurality of post inner permutation data groups generated by an inner permutation, the outer permutation being performed based on a first permutation sequence $P_{op}$ computed based on the following equation: $P_{op}(m)=(q(m) \bmod N_A)*N_{Gip}+\text{floor}(q(m)/N_A)$,
wherein $m=0, 1, \ldots, N_{RU,op}-1$, $q(m)=m+\text{floor}(r(m)/(N_A-1))$, $r(m)=\max(m-(N_{RU,op} \bmod N_{Gip})*N_A, 0)$, and $N_A=\text{floor}(N_{RU,op}/N_{Gip}+1)$, and
wherein $N_{RU,op}$ is a predetermined integer number associated with the prior outer permutation data group, and $N_{Gip}$ is a predetermined integer number associated with the plurality of post inner permutation data groups included within the prior outer permutation data group.

35. The wireless communication method of claim 34, wherein computing the permutation sequence comprises computing a basic permutation sequence $P_0$ based on the following equation: $P_0(j)=j+1$, wherein, $j=0, 1, \ldots, N_{RU,ip}-1$, and wherein $N_{RU,ip}$ is a predetermined integer number.

36. The wireless communication method of claim 35, wherein computing the permutation sequence comprises computing a second permutation sequence based on the following equation:

$Sca_{output}(k,s)*N_{RU,ip}*n_k+\{P_s[n_k \bmod N_{RU,ip}]+ \text{PermBase}\} \bmod N_{RU,ip}$ wherein $Sca_{output}(k,s)$ stands for a permutation output index in a second data stream generated by the permutation, k stands for an integer number from 0 to $N_{unit}$, $N_{unit}$ being a predetermined integer number associated with the first data stream to be permuted, s stands for an integer number from 0 to $N_{RU,ip}$, $n_k$ equals to $(k+13*s) \bmod N_{unit}$, $P_s$ is a data sequence obtained by shifting the basic permutation sequence $P_0$ cyclically to the left by s times, and PermBase is a predetermined number, and wherein performing the permutation on the first data stream includes performing the inner permutation based on the first permutation sequence, and generating the post inner permutation data group.

* * * * *